United States Patent [19]
Schoenewolff et al.

[11] Patent Number: 6,134,866
[45] Date of Patent: Oct. 24, 2000

[54] APPARATUS FOR MANUFACTURING ARTICLES

[75] Inventors: Michael J. Schoenewolff, West Palm Beach; Richard Q. Poynter; Jeffrey L. Price, both of Palm Beach Gardens, all of Fla.

[73] Assignee: Vital Signs, Inc., Totowa, N.J.

[21] Appl. No.: 09/222,695

[22] Filed: Dec. 29, 1998

[51] Int. Cl.[7] .......................... B65B 31/00; B65B 55/00; E04B 2/00

[52] U.S. Cl. ................... 53/561; 53/426; 422/33

[58] Field of Search ............... 53/561, 559, 453, 53/426, 425; 422/304, 302, 124, 123, 297, 292, 291, 33, 28

[56] References Cited

U.S. PATENT DOCUMENTS

| | | | |
|---|---|---|---|
| 3,325,860 | 6/1967 | Hansen | 18/5 |
| 3,911,640 | 10/1975 | Rausing | 53/426 |
| 4,533,515 | 8/1985 | Witter et al. | 53/425 X |
| 4,656,813 | 4/1987 | Baldini et al. | 53/426 X |
| 4,880,581 | 11/1989 | Dastoli et al. | 264/39 |
| 5,534,222 | 7/1996 | Kelbrick et al. | 422/33 |
| 5,538,506 | 7/1996 | Farris et al. | 604/187 |
| 5,620,425 | 4/1997 | Heffernan et al. | 604/281 |
| 5,759,218 | 6/1998 | Martin et al. | 53/561 X |
| 5,953,884 | 9/1999 | Lawecki et al. | 53/426 X |

*Primary Examiner*—James F. Coan
*Attorney, Agent, or Firm*—R. Gale Rhodes, Jr.

[57] ABSTRACT

Apparatus for manufacturing articles including isolation structure isolating the first end of an article producing machine from the second end of the machine to permit a higher level of cleanliness to be established at the first machine end where the articles are actually manufactured than at the second machine end.

6 Claims, 7 Drawing Sheets

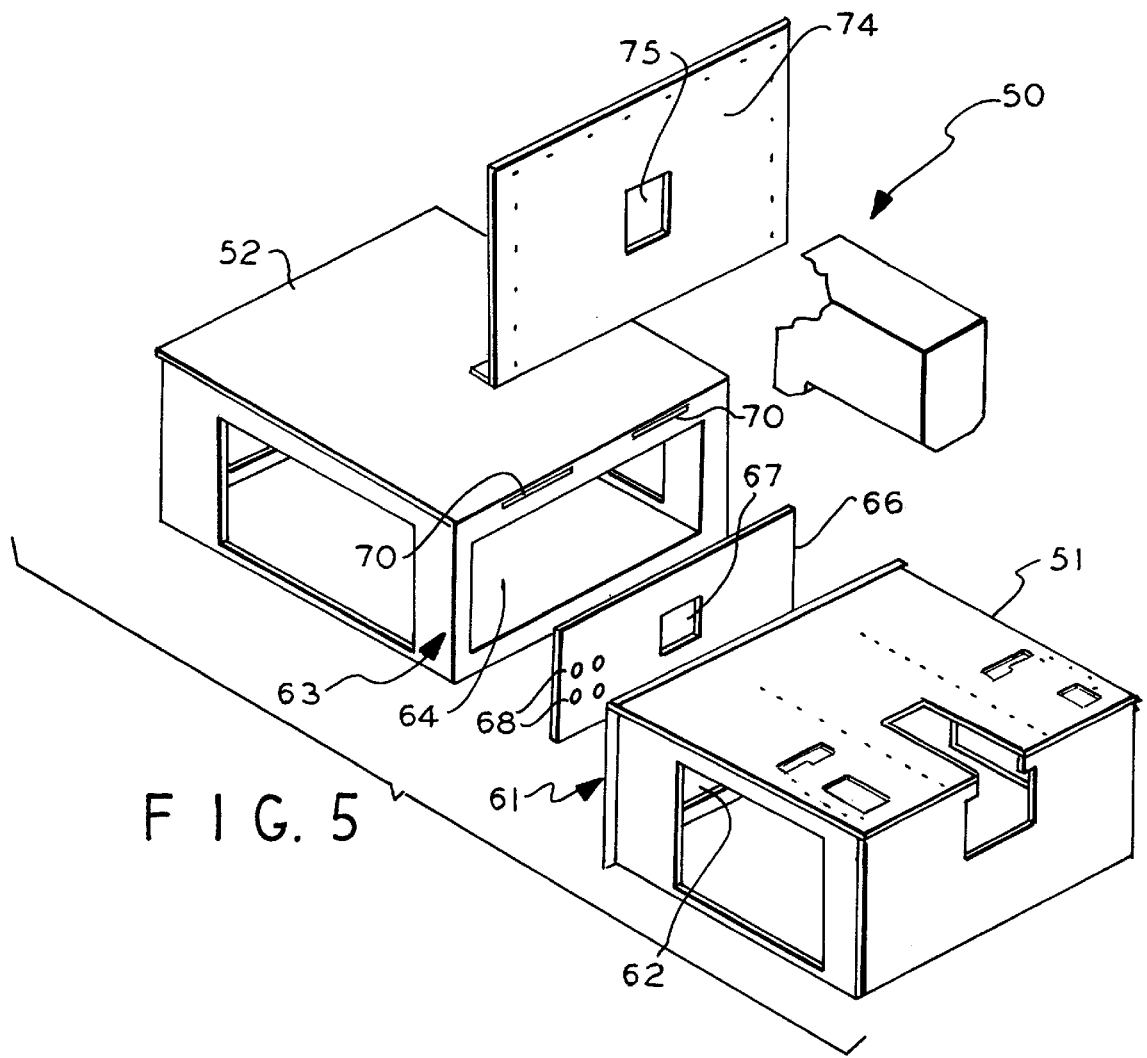
F I G. 5
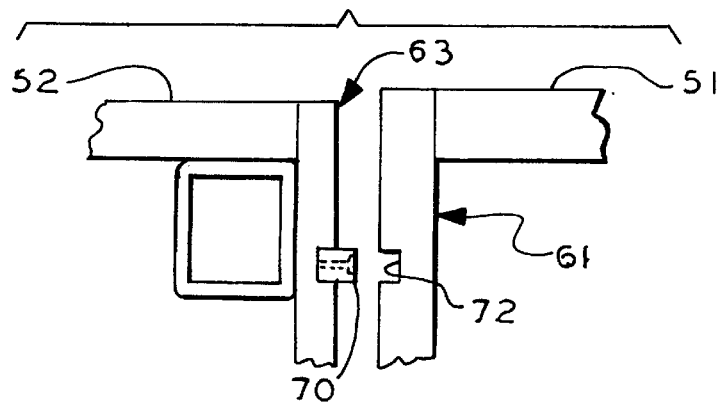
F I G. 8

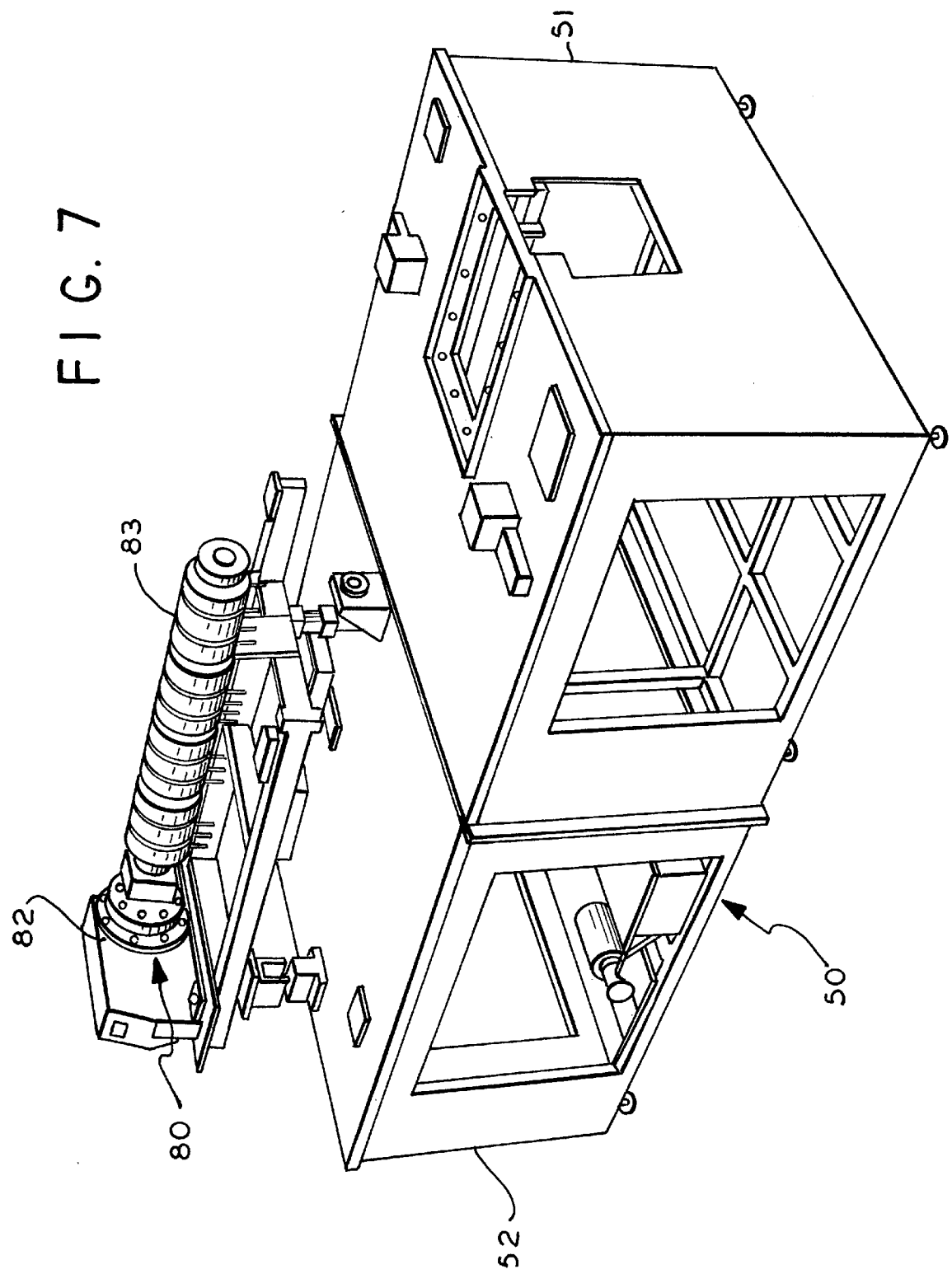

6,134,866

APPARATUS FOR MANUFACTURING ARTICLES

BACKGROUND OF THE INVENTION

This invention relates generally to apparatus for manufacturing articles, and more particularly, relates to apparatus for aseptically manufacturing articles, such as by way of example and not by way of limitation, pre-filled plastic syringes.

A pre-filled plastic syringe known to the art is disclosed in U.S. Pat. No. 5,538,506, entitled PRE-FILLED FLUID SYRINGE, patented Jul. 23, 1996, Farris et al inventors; this patent is hereby incorporated by reference as if fully reproduced herein. Another pre-filled plastic syringe known to the art is disclosed in U.S. Pat. No. 5,620,425 entitled METHOD FOR THE PREPARATION OF PRE-FILLED PLASTIC SYRINGES, patented Apr. 15, 1997, Heffernan et al inventors; this patent is hereby incorporated by reference as if fully reproduced herein. FIG. 2 of incorporated U.S. Pat. No. 5,620,425 includes a table defining the airborne particulate cleanliness classes in accordance with Federal Standard 209(E) of Sep. 11, 1992 and FIG. 3 of this patent shows three tables indicating classes of microbial levels under different conditions set forth in Pharmacopeial Forum, Volume 18, No. 55 pp. 4048–54 (September–October, 1992). These cleanliness classes and classes of microbial levels are defined in the incorporated U.S. Pat. No. 5,620,425 at Column 3, Lines 1–28.

As is further known, such pre-filled plastic syringes typically include what is referred to in the art as liquid injectables, for example, saline solution for being injected into a catheter in-dwelling in a patient's vein and liquid manufactured under a cleanliness condition or level equalling or exceeding class 10,000 as set forth in FIG. 2 of the incorporated U.S. Pat. No. 5,620,425.

As is further known to the art, the blow-fill-seal manufacturing process practiced by the blow-fill-seal machines known to the prior art is generally considered to be a preferred process for manufacturing such pre-filled plastic syringes. In such blow-fill-seal manufacturing process, a semi-molten, hollow, cylindrical plastic parison is extruded downwardly between cavities provided in pairs of open and opposed main and sealing molds and open and opposed pair of gripping jaws mounted for reciprocal movement toward and away from each other; the mold cavities are shaped complementarily to the pre-filled plastic syringe to be formed. The gripping jaws grip the upper portion of the parison and the main molds are then closed around the lower portion of the plastic parison to seal the bottom of the syringe after which a cutting knife severs the upper portion of the parison to separate it from the extruder. Pressurized air is then injected into the severed lower parison portion to force lower portions of the parison outwardly against the walls of the main mold cavities to partially form the syringe but leaving the partially formed syringe open at the top for subsequent liquid filling. Thereafter, a liquid fill nozzle is advanced above, or slightly into, the open top of the partially formed plastic syringe and liquid, such as the above-noted saline solution or liquid pharmaceutical, is injected or dispensed into the partially formed plastic syringe after which the filling nozzle is withdrawn and the sealing molds are closed to seal the upper portion of the parison and complete the forming or molding of the pre-filled plastic syringe.

Aside from the known economic advantages of the blow-fill-sealing process, such process, as generally noted above, is a preferred process in the art for the aseptic manufacture of sterile liquid products such as the above-noted liquid injectables due to limited need for human intervention in the process, and hence minimal opportunity for microbial or pathenogenic micro-organism contamination due to human intervention. One limitation, as is also known to the art, is that in the blow-fill-sealing process particulate, sometimes referred to as non-viable particulate, are generated during the extrusion of the plastic parison in the blow-fill-sealing process noted above. These particulate can potentially provide the means for transport for pathogenic micro-organisms into the partially formed and open plastic syringe prior to the final sealing step.

A blow-fill-seal machine, practicing the blow-fill-sealing process, is disclosed in U.S. Pat. No. 3,325,860 patented Jun. 20, 1967, entitled MOLDING AND SEALING MACHINES, Gerhard Hansen inventor; this patent is hereby incorporated herein by reference as if fully reproduced herein.

Referring to FIG. 1 there is shown a clean room of the type known to the prior art and identified by general numerical designation 10. A blow-fill-seal machine indicated by general numerical designation 12 resides in the clean room 10 and the blow-fill-sealing machine 12 may be of the general type disclosed in incorporated U.S. Pat. No. 3,325,860. Generally, and as shown diagrammatically, the blow-fill-sealing machine 12 includes an extruder 14 including an extruder barrel 15 for extruding a parison 16, and reciprocally mounted holding jaws, sealing molds and main molds indicated collectively by general numerical designation 18. In this embodiment, as indicated diagrammatically, the molds 18 include three mold cavities 19, 20 and 21 for simultaneously molding three plastic syringes by the blow-fill-sealing process. The molds 18 are mounted for reciprocal movement between the solid line position shown in FIG. 1 into the dashed line position also shown in FIG. 1 below the liquid filling head which is indicated by general numerical designation 22. The filling head 22 includes a filling nozzle or needle 23 for filling the partially molded plastic syringes in the manner noted above prior to the final sealing step. On completion of manufacturing, the three plastic syringes, indicated diagrammatically by numerals 26, 27 and 28, are transported by conveyor 30 to a suitable packing area for packing and shipping of the pre-filled plastic syringes.

As known to the art, and referring still to FIG. 1, the blow-fill-seal machine 12 includes, although not shown, vacuum hoses, hydraulic hoses, a hydraulic power pack, a cooling mechanism for the extruder, a vacuum accumulator, incoming air lines, air filters and automatic drain for a compressed air circuit. Attendant support apparatus are also included for the blow-fill-seal machine 12, such as a wall mounted electrical circuit box 31 for applying electrical power to the blow-fill-sealing machine 12 over electrical connectors 32 and pumps and condensate drain return pump and tank indicated diagrammatically by numerical designation 33. As is further known, such support apparatus produce particulate matter which, as also noted above, can provide a transport for pathogenic microorganisms. Further, and as also noted above, the parison 16, in the blow-fill-seal manufacturing process, is severed by a suitable knife 34, and such severing of the parison 16, as is known to the art, produces smoke and particulate which can act as a transport for pathogenic microorganisms.

As is still further known, to satisfy the Federal Drug Administration (FDA) Good Manufacturing Practices, the interior 36 of the clean room 10 should be maintained at a cleanliness condition equaling or exceeding class 10,000 as identified in the table of FIG. 2 of the incorporated U.S. Pat.

No. 5,620,425. To maintain such class 10,000 cleanliness condition or level in the interior 36 of the clean room 10, and as is still further known to the art, pressurized high efficiency particulate (HEPA) air is forced or admitted into the interior 36 of the clean room 10 as indicated by the downward extending arrows 10. A suitable HEPA air source is indicated by general numerical designation 38 and, as known to the art, such HEPA air source includes a plurality of HEPA air filters for filtering pressurized air from a suitable source indicated diagrammatically in FIG. 1 by numerical designation 38. Suitable exhausts, as known to the art, are provided in the clean room 10 to exhaust the pressurized HEPA air which carries away and removes the particulate from the interior 36 of the clean room 10.

As is still further known, the establishment of class 10,000 cleanliness condition or level in the entire interior 36 of the clean room 10 is expensive and, since the blow-fill-seal machine 12, and its attendant support structure noted above, periodically require maintenance, such maintenance requires that mechanics, human beings providing a source of pathogenic microorganisms, must occasionally enter the interior 36 of the clean room 10 to perform maintenance or repair functions. Such maintenance or repair typically requires that the manufacturing process being performed by the blow-fill-seal machine 36 be stopped, the maintenance or repair made, after which the interior of the clean room 10 must again be flooded with the HEPA air to remove particulate brought into the clean room by the mechanics or repair people after which the manufacturing process can again be commenced. Such interruption undesirably reduces productivity and increases the expense of manufacture whereas it is highly desirable that the manufacturing process performed by the blow-fill-seal machine 10 be as uninterrupted as is reasonably possible.

Accordingly, there is a general need in the art for a new and improved manufacturing apparatus for manufacturing articles which is efficient and less expensive. More specifically, there is need in the art for apparatus for aseptically manufacturing articles, such as the above-noted pre-filled plastic syringes produced by the blow-fill-sealing process, which apparatus is efficient and less expensive and which apparatus maintains class 10,000 or better cleanliness condition at the end of the machine where, for example, the pre-filled plastic syringes are actually being produced.

SUMMARY OF THE INVENTION

Apparatus for manufacturing articles including isolation structure isolating the first end of an article producing machine from the second end of the machine to permit a higher level of cleanliness to be established at the first machine end where the articles are actually manufactured than at the second machine end.

DESCRIPTION OF THE DRAWINGS

FIG. 5 is an exploded view in perspective of a support embodying the present invention;

FIG. 7 is a perspective view of a portion of a blow-fill-seal machine, namely a portion of the extruder and the extruder barrel, shown mounted to a support embodying the present invention; and FIG. 8 is a partial view of the respective and portions of table-like members comprising the support of the present invention and illustrating a key member and indentation for aligning such end portions prior to being fastened together.

DETAILED DESCRIPTION OF THE PRESENT INVENTION

Figure 2:
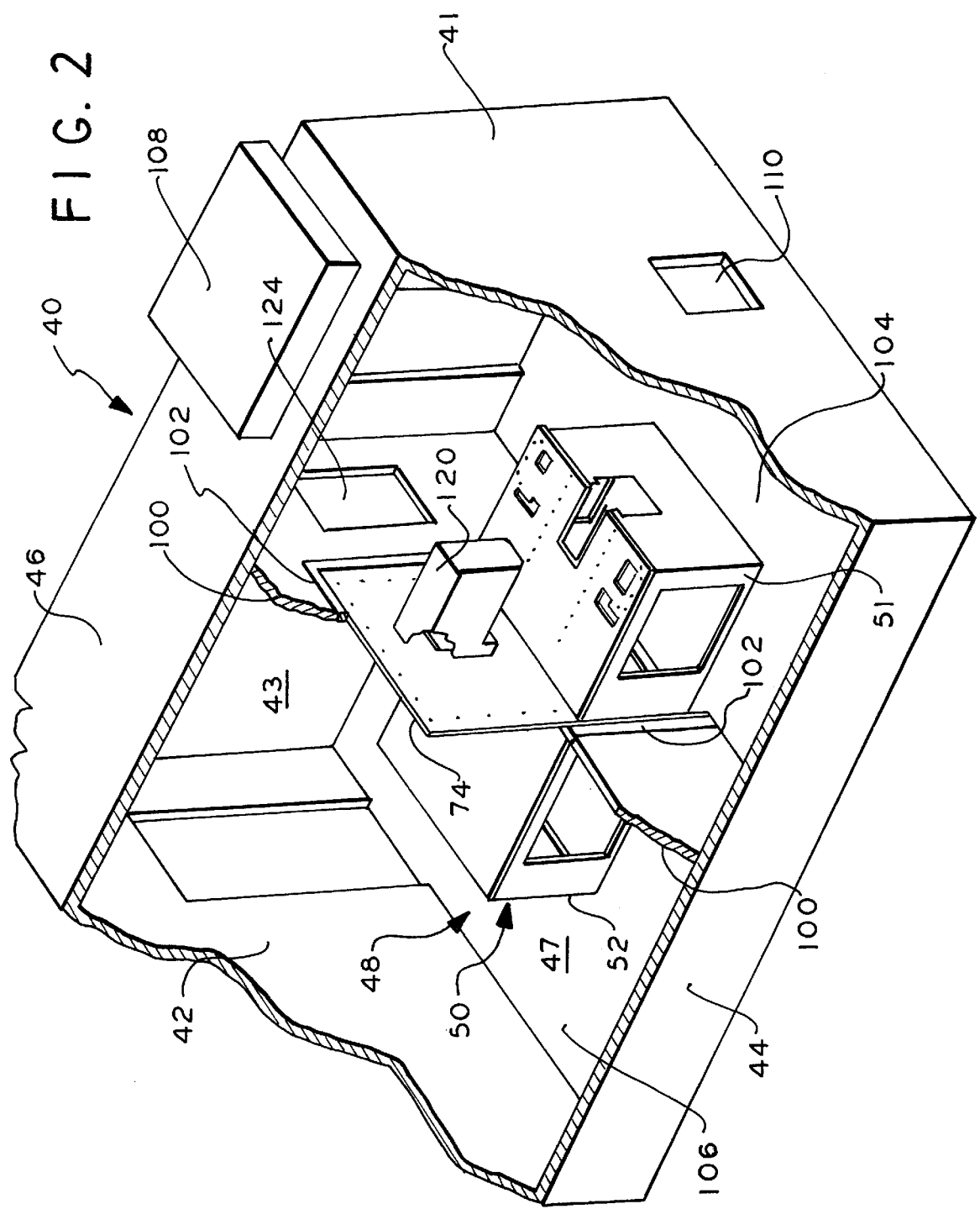
FIG. 2 is a perspective view, partially in cross-section, of apparatus for manufacturing articles embodying the present invention but absent the machine for manufacturing articles.
Figure 3:
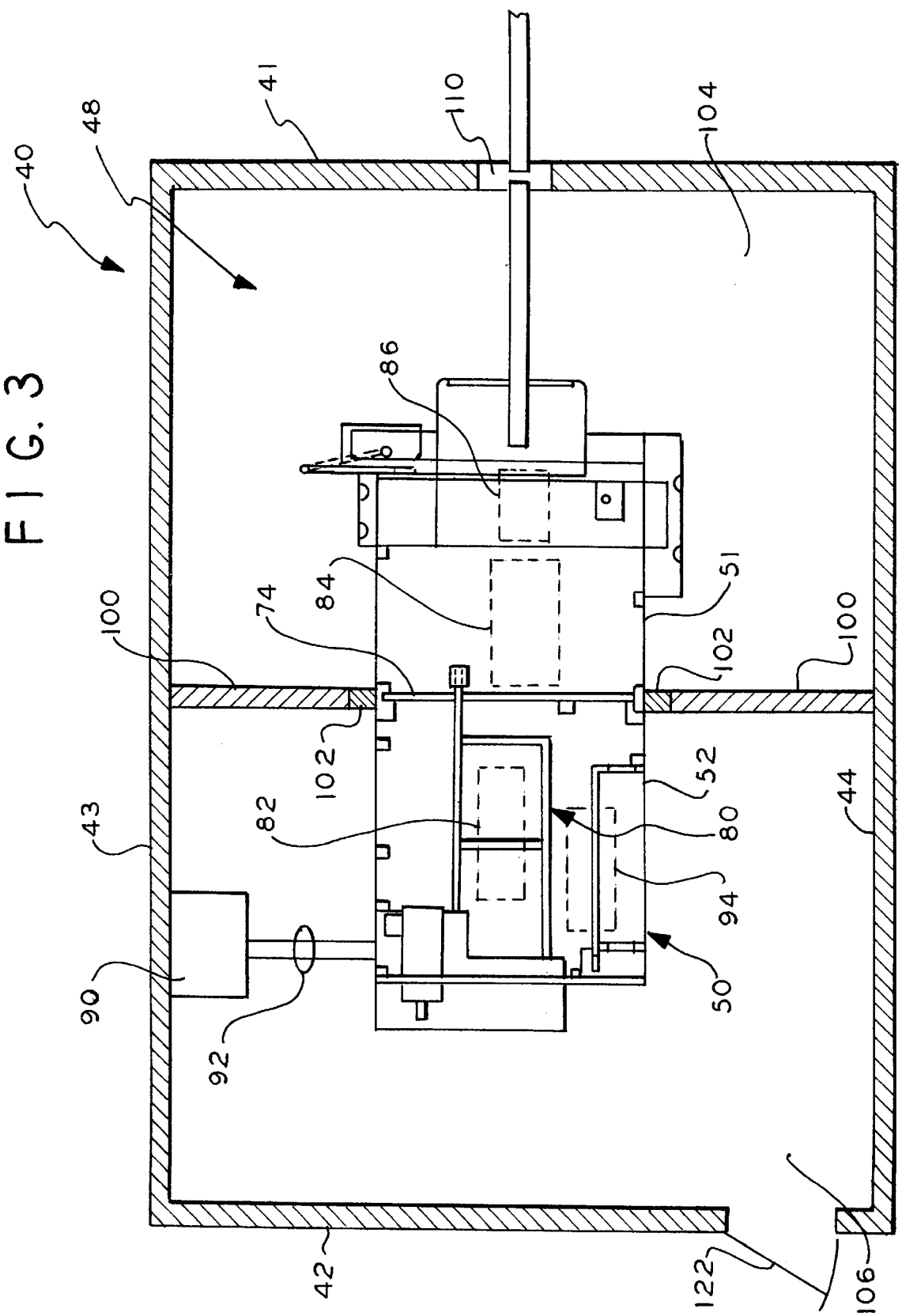
FIG. 3 is a top view, partially in cross-section, of apparatus for manufacturing articles embodying the present invention.
Figure 4:
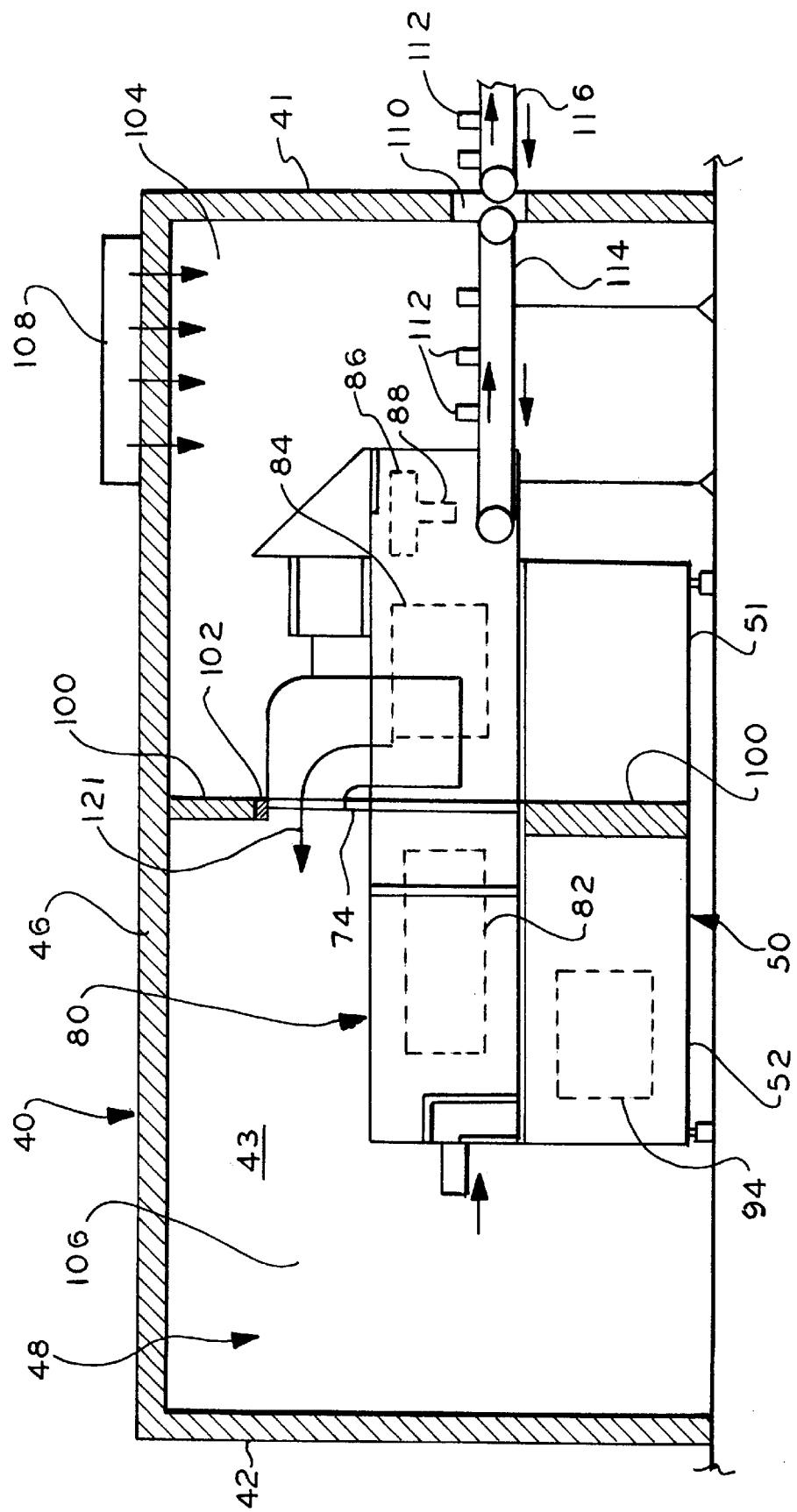
FIG. 4 is a vertical elevational view, partially in cross-section, of apparatus for manufacturing articles embodying the present invention.

Referring collectively to FIGS. 2–4, apparatus is shown embodying the present invention and indicated by general numerical designation 40. Apparatus 40 may include opposed end walls 41 and 42 and opposed side walls 43 and 44. Apparatus 40 may, FIG. 2, include a ceiling 46 and a bottom 47. Alternatively, instead of including the ceiling 46 and bottom 47, the opposed end walls 41 and 42 and opposed side walls 43 and 44 may sealingly engage the ceiling and floor of a suitable factory area and may be suitably sealed thereto, in the manner known to the art, to prevent the passage of air flow there between. It will be understood that opposed end walls 41 and 42 and opposed side walls 43 and 44, and ceiling 46 and bottom 47, if provided as noted above, provide or enclose a manufacturing room indicated by general numerical designation 48.

Apparatus 40, FIGS. 2–7, may include a support indicated by general numerical designation 50 and, FIGS. 3, 4 and 7, a blow-fill-seal machine indicated by general numerical designation so, the machine 80 is supported by the support 50. The blow-fill-seal machine 80 may be generally of the type disclosed in incorporated U.S. Pat. No. 3,325,860 and shown diagrammatically and indicated by general numerical designation 12 in FIG. 1 and described above in connection with FIG. 1.

The blow-fill-seal machine 80, FIGS. 3, 4 and 7 includes an extruder 82 which includes an extruder barrel 83 shown in FIG. 7. In addition, extruder 80, FIGS. 3 and 4, includes reciprocally mounted gripping jaws, sealing molds and main molds shown in dashed outline and indicated by numerical designation 84. In addition, the blow-fill-sealing machine 80 includes a liquid filling head also shown in dashed outline and indicated by numerical designation 86 in FIGS. 3 and 4; the liquid filling head 86, as shown in FIG. 4, includes a fill nozzle or needle 88. The blow-fill-sealing machine 80, FIG. 3, is also provided with attendant support apparatus such as a stand alone electrical box 90 for applying electrical power to the blow-fill-sealing machine 80 over electrical connectors 92 and pumps and condensate drain return pump and tank mounted in the support 50 and indicated by numerical designation 94.

Figure 6:
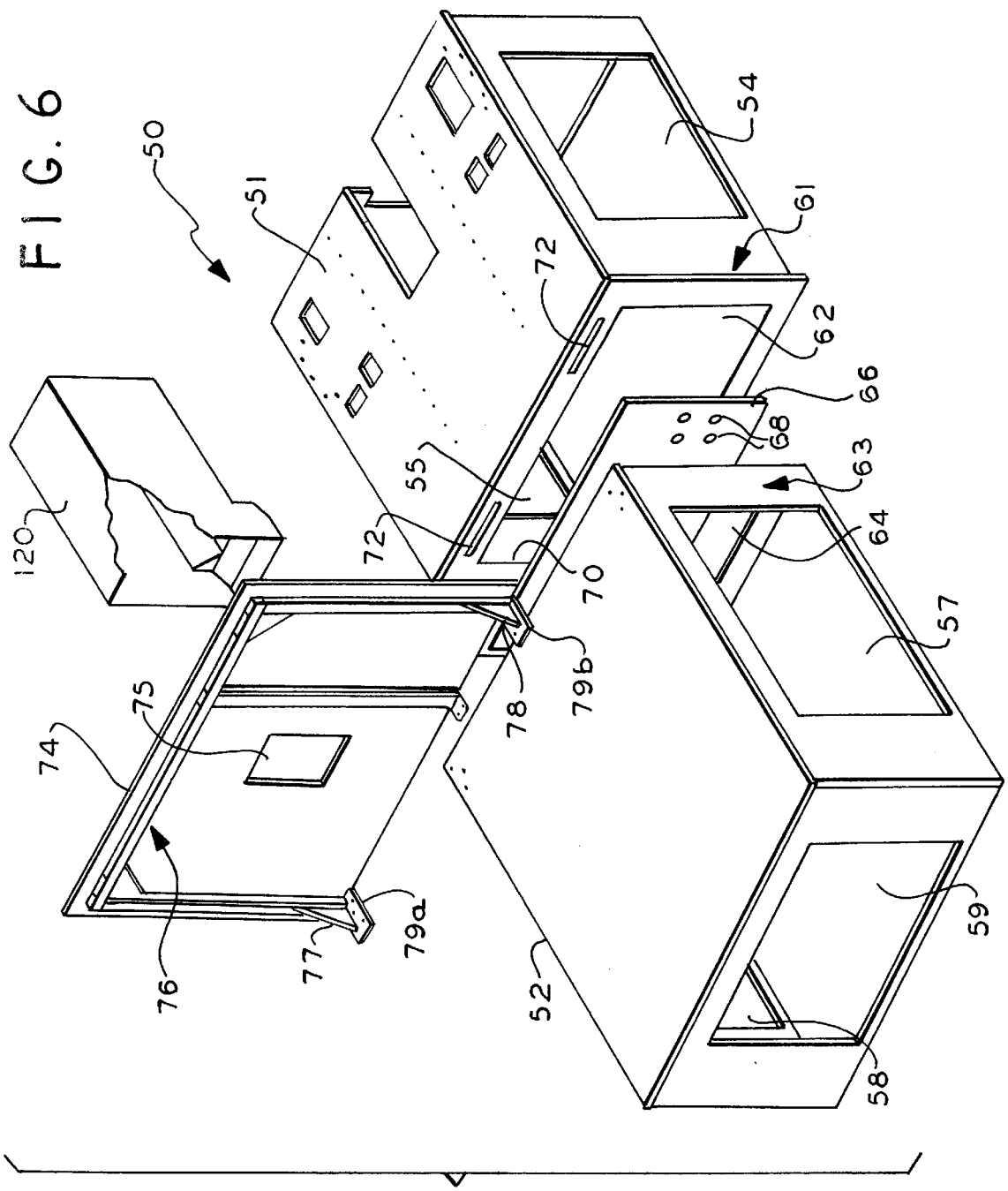
FIG. 6 is an exploded view similar to FIG. 5 but taken from a generally reversed perspective.

Support 50, FIGS. 2, 5 and 6, may include a first table-like member 51 and a second table-like member 52. As shown particularly in FIGS. 5 and 6, the table-like member 51 includes walls or legs provided with openings 54 and 55 and table-like member 52 includes walls or legs provided with openings 57, 58 and 59, the openings provide access to portions of the blow-fill-seal machine mounted respectively underneath the table-like members 51 and 52 for repair and maintenance. Referring further particularly to FIGS. 5 and 6, the table-like member 51 includes an end portion 61 provided with an opening 62 and table-like member 52 includes an end portion 63 provided with an opening 64.

Apparatus 40 of the present invention, and referring again to FIGS. 5 and 6, may further include a planar wall member 66, which may be referred to as a flange plate, and which is provided, particularly FIG. 5, with an opening 67 through which a manifold comprising a portion of the blow-fill-seal machine 80 may extend and may be further provided with a plurality of openings 68 through which suitable utility connections, such as electrical and pneumatic lines, comprising a portion of the blow-fill-seal machine 80 may extend. As will be understood from FIG. 5, the planar wall member 66 may be mounted to the end portion 63 of the table-like member 52 by suitable bolts, not shown. After the planar wall member 66 is mounted to the end portion 63 of the table-member 52, the table-members 51 and 52 are assembled and fastened together by suitable bolts not shown to provide the support 50. To facilitate the alignment of the table-like members 51 and 52 for their assembly and fastening together, it will be understood, particularly from FIG. 8, that a generally rectangular and key member 70 may be fastened to the end portion 63 of the table-like member 52, with a portion of the key member 74 extending outwardly, and that the end portion 61 of the table-like member 51 is provided with a corresponding indentation 72 for receiving the outwardly extending portion of the key member 70. It will be further understood as indicated diagrammatically in FIGS. 5 and 6 that a plurality of key members 70 may be provided on the end portion 63 of the table-like member 52 and that a plurality of indentations 72 may be provided in the end portion 61 of the table-like member 51 to further assure the proper alignment of the table-like members 51 and 52 for their assembly and fastening together. It will be further understood from FIGS. 5 and 6 that upon the planar wall member 66 being mounted to the end portion 63 of the table-like member 52 and upon the table-like members 51 and 52 being assembled and fastened together, that the planar wall member 66, except for the openings 67 and 68 referred to above, closes the opposed openings 62 and 64 formed respectively in the end portions 61 and 63 of the respective table-like members 51 and 52.

Apparatus 40 of the present invention, FIGS. 2–6, may include a planar wall member 74 provided with an opening 75 through which the extruder barrel 83 (FIG. 7) extends. It will be understood that the extruder barrel 83 moves upwardly and downwardly and hence the opening 75 provided in the planar wall member 74 is oversized with respect to the extruder barrel 83 to accommodate the upward and downward movement of the extruder barrel.

Referring again to FIGS. 5 and 6 and in particular to FIG. 6, it will be understood that the planar wall member 74 is provided with a frame indicated by general numerical designation 76, suitably secured to the planar wall member 74 such as by bolts (not shown), and which frame member 76 includes angular gussets 77 and 78 for structural support and mounting pads 79a and 79b for fastening the planar wall member 74 to the end portion 63 of the table-like member 52 by suitable bolts (not shown), to cause the planar wall member 74 to extend perpendicularly upwardly from the table-like member 52 and thereby perpendicularly upwardly from the support 50; such mounting of the planar wall member 74 may be best seen from FIG. 2.

Apparatus 40, FIGS. 2–3 may further include an intermediate wall 100 which is disposed parallel to the end walls 41 and 42 and perpendicular to the side walls 43 and 44. A suitable seal 102, of the type known to the art for providing a flexible seal between adjacent structural members, may be included to provide a seal between the intermediate wall 100, the support 50 and the planar wall member 74. It will be understood in accordance with the teachings of the present invention that the intermediate wall 100, seal 102, planar wall member 74 and planar wall member 66 (FIGS. 5 and 6) cooperatively provide isolation structure or means which separate the manufacturing room 48 into a clean room 104 and a mechanical room 106 which are effectively air-sealed from each other by such isolation structure or means. From FIGS. 3 and 4 it will be understood that the rightward portion (as viewed in FIGS. 3 and 4) of the blow-fill-seal machine 80 and the table-like member 51 comprising the support 50 reside in the clean room 104 and that the leftward (as viewed in FIGS. 3 and 4) of the blow-fill-seal machine 80 including extruder 82 and the attendant support apparatus including the electrical circuit box 92 and pumps and condensate drain return pump and tank 94 residing in the mechanical room 106. Further, FIGS. 2 and 4, apparatus 40 may further include a suitable source of HEPA air 108 for providing a flow of pressurized HEPA air indicated by the downward extending arrows in FIG. 4 to the clean room 104 at a pressure of about 0.1 to about 0.3 inch of water. The end wall 41, FIGS. 2–3, is provided with an opening 110 through which article 112, such as the above-noted pre-filled syringes produced by the blow-fill-seal machine 80, may pass from a suitable conveyor 114 located in the clean room 104 to a suitable conveyor 116 residing in the factory space to the right of the opening 110 for packaging and shipping; the presence of the air in such factory space will be at ambient pressure which normally will be at atmospheric pressures.

It will be further understood that the portions of the blow-fill-seal machine 80 located in the clean room 104 produce less particulate than do the portions of the blow-fill-seal machine, and the attendant support apparatus 92 and 94, located in the mechanical room 106, and accordingly, there will be less particulate in the clean room 104 than in the mechanical room 106 due to the isolation structure or means provided cooperatively by the intermediate well 100, seal 102, planar wall member 74 and planar wall member 66 (FIGS. 4 and 5).

Further, apparatus 40 may include a suitable chimney 120 mounted suitably to the planar wall 74, such as by suitable bolts (not shown), may be provided to induce a flow of air from clean 104 into the mechanical room 106 which may include particulate produced in the severing of the parison as noted above, such induced air flow is indicated by the curved arrow 121 in FIG. 4.

As will be noted from FIG. 3, the apparatus 40 may be provided with a suitably mounted swinging door 122 which may be opened and closed, to allow mechanics to enter the clean room to provide maintenance and repair of the portion of the blow-fill-seal machine 80 located in the mechanical room while the manufacture of articles, such as the above-noted pre-filled syringes, may proceed uninterruptedly in the clean room 104, hence the pressure of the air in the mechanical room will also typically be at ambient or atmospheric pressure. If desired, a suitable window 124 (FIG. 2) may be provided in the intermediate wall 100.

It will be further understood in accordance with the teachings of the present invention that since pressurized HEPA air is provided to the clean room 104, the pressure of the HEPA air in the clean room 104 is greater than the ambient air pressure in the mechanical room 106, and greater than the ambient air pressure present in the factory space to the right of the opening 110 and hence although the opening 75, FIGS. 5 and 6, is oversized with respect to the extruder barrel 83 (FIG. 7) and although the opening 110 in the end and wall 41 is open at all times, air will only flow outwardly from the clean room 104 through the oversized opening 75 and the opening 110 and ambient air to the right of the opening 110 in FIG. 4 and ambient air in the mechanical room 106 will not flow into the clean room and hence particulate present in the mechanical room 106 and the ambient to the right of the opening 110 in FIG. 4 will not flow into the clean room 104.

Figure 1:
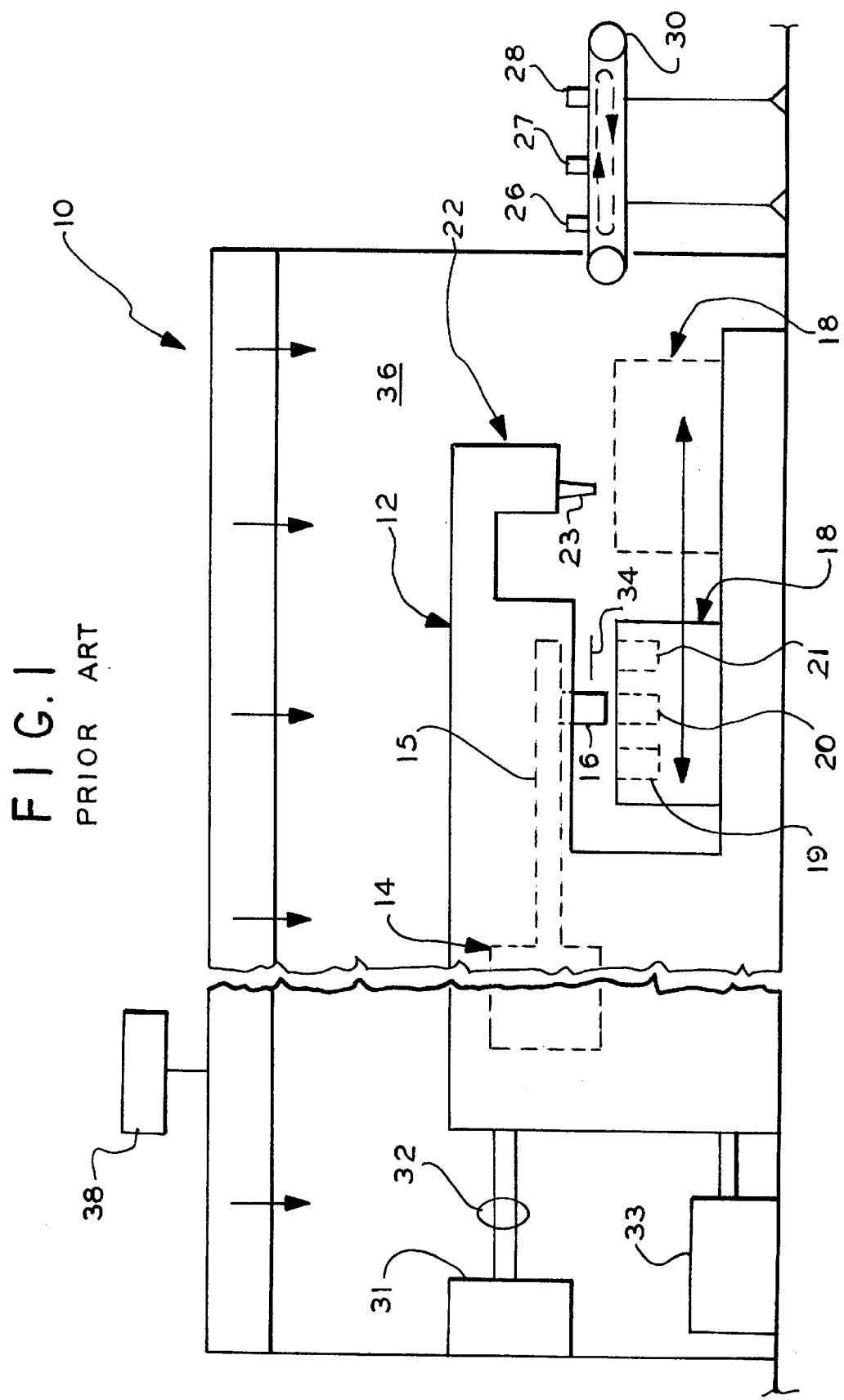
FIG. 1 is a diagrammatical elevational view of a prior art clean room and blow-fill-seal machine.

It will be appreciated that the present invention, including the isolation structure or means provided cooperatively by the intermediate wall 100, seal 102, planar wall member 74 and planar wall member 66, generally speaking, permits the clean room 104, e.g. FIGS. 3 and 4, to be reduced by approximately one-half of the size and capacity of the HEPA air providing apparatus to approximately one-half of that required for the prior art clean room 10 shown in FIG. 1 increases the maintainability of the blow-fill-seal machine 80 by placing the major particulate producing components of the machine in mechanical room 106 and decreases the heat load present in the clean room 104 which heat load is largely produced by the components of the blow-fill-seal machine 80 located in the mechanical room 106.

The table-like members 51 and 52 and planar wall members 66 and 74 may be made of type 304 stainless steel by suitable known manufacturing techniques.

It will be understood that many variations and modifications may be made in the present invention without departing from the spirit and scope thereof.

What is claimed is:

1. Apparatus for manufacturing articles, comprising:

room means providing a manufacturing room;

support means residing in said manufacturing room, said support means including opposed first support means portion and second support means portion and further including an intermediate support means portion intermediate said first support means portion and said second support means portion, said first support means portion comprising a first table-like member including a first end portion, said second support means portion comprising a second table-like member including a second end portion, said first end portion and said second end portion being in abutment, and said apparatus further including fastening means for fastening said first end portion and said second end portion together, said fastening means including at least one key member mounted to one of said first end portion and said second end portion and an indentation provided on the other of said first end portion and said second end portion and said indentation for receiving said key member, said key member and said indentation for aligning said first end portion with said second end portion to facilitate said first end portion and said second end portion being fastened together by said fastening means;

machine means for manufacturing the articles, said machine means including opposed first machine means portion and second machine means portion and further including an intermediate machine means portion intermediate said first machine means portion and said second machine means portion, said first machine means portion supported by said first support means portion and said second machine means portion supported by said second support means portion;

isolation means engaging at least said room means and said intermediate support means portion and separating said manufacturing room into a first manufacturing room portion and a second manufacturing room portion, said first support means portion and said first machine means portion residing in said first manufacturing room portion and said second support means portion and said second machine means portion residing in said second manufacturing room portion, and said isolation means including a first planar wall mounted to and extending perpendicularly upwardly from said intermediate support means portion, and said first planar wall provided with at least one opening through which a first portion of said intermediate machine means portion extends; and said isolation means permitting a first condition of cleanliness to be established in said first manufacturing room portion and permitting a second condition of cleanliness to be present in said second manufacturing room portion, said first condition of cleanliness being greater than said second condition of cleanliness.

2. The apparatus according to claim 1 wherein said first end portion includes a first opening, wherein said second end portion includes a second opening, wherein said first opening and said second opening are in opposition and wherein said isolation means further includes a second planar wall mounted to one of said first end portion and said second end portion and for closing said first opening and said second opening, and wherein said second planar wall is provided with at least one opening through which a second portion of said intermediate machine portion extends.

3. The apparatus according to claim 2 wherein said room means include opposed end wall portions and opposed side wall portions and wherein said isolation means include sealing means and an intermediate wall intermediate said end wall portions and perpendicular to said side wall portions and wherein said sealing means are intermediate said intermediate wall and said intermediate support means portion and said first planar wall and provides a seal there between.

4. The apparatus according to claim 3 wherein said apparatus are apparatus for aseptically manufacturing articles and wherein said machine means are a blow-fill-seal machine.

5. The apparatus according to claim 4 wherein said articles are pre-filled syringes, wherein said blow-fill-seal machine includes opposed first blow-fill-seal portion and second blow-fill-seal portion, wherein said first blow-fill-seal machine portion is supported by said first support means portion and resides in said first manufacturing room portion, wherein said second blow-fill-seal seal machine portion is supported by said second support means portion and resides in said second manufacturing room portion, wherein said first blow-fill-seal machine portion produces particulate and wherein said second blow-fill-seal machine portion produces particulate and wherein the particulate produced by said second blow-fill-seal machine portion exceeds the particulate produced by said first blow-fill-seal machine portion.

6. The apparatus according to claim 4 wherein said apparatus further comprises HEPA air providing means for providing a pressurized flow of HEPA air to said first manufacturing room portion at a pressure of about 0.1 to about 0.3 inch of water.

* * * * *